United States Patent [19]

Bearden et al.

[11] Patent Number: 5,235,587
[45] Date of Patent: Aug. 10, 1993

[54] OPTICAL DATA STORAGE APPARATUS AND METHOD

[75] Inventors: Alan J. Bearden, Berkeley; Michael P. O'Neill, Orinda, both of Calif.

[73] Assignee: The Regents of the University of California, Oakland, Calif.

[21] Appl. No.: 676,263

[22] Filed: Mar. 27, 1991

Related U.S. Application Data

[63] Continuation-in-part of Ser. No. 414,897, Sep. 29, 1989, Pat. No. 5,029,023.

[51] Int. Cl.$^5$ .............................................. G11B 7/00
[52] U.S. Cl. ................................ 369/106; 369/112; 369/116; 369/275.3; 369/275.4
[58] Field of Search ................... 369/106, 54, 55, 112, 369/116, 121, 275.1, 275.3, 275.4, 275.5

[56] References Cited

U.S. PATENT DOCUMENTS

| | | | |
|---|---|---|---|
| 4,161,752 | 7/1979 | Basilico | 369/275.4 |
| 4,361,402 | 11/1982 | Costa | 356/73.1 |
| 4,375,088 | 2/1983 | de Haan et al. | 369/275.3 |
| 4,441,179 | 4/1984 | Slaten | 369/275.5 |
| 4,443,873 | 4/1984 | Anthon | 369/110 |
| 4,451,914 | 5/1984 | LaBudde et al. | 369/109 |
| 4,554,836 | 11/1985 | Rudd | 73/657 |
| 4,556,967 | 12/1985 | Braat | 369/275.4 |
| 4,807,214 | 2/1989 | Getreuer | 369/275.3 |
| 4,899,327 | 2/1990 | Bates et al. | 369/106 |
| 4,927,263 | 5/1990 | de Groot et al. | 365/5 |

OTHER PUBLICATIONS

Sarid, D. et al., IEEE J. Quantum Elec., (1989) 25(8):1968–1972.
Hansma, P. K. et al., Science (Oct. 14, 1988) 242:109–215.
Rugar, D. et al., Rev. Sci. Inst. (1988) 59:2337–2340.
Wang, C. P., Lasers & Optronics, (Sep. 1987) pp. 69–71.
Acket, G. A. et al., IEEE J. Quantum Elec., (1984) QE-20(10):1163–1169.
Potter, I. C., J. Appl. Physics, (1969) 40(12):4770–4776.
Deferrari, H. A., J. Acoust. Soc. Am. (1967) 42(5):982–990.
Deferrari, H. A. et al., J. Acoust. Soc. Am. (1966) 39(5):979–980.

Primary Examiner—Paul M. Dzierzynski
Assistant Examiner—Kiet T. Nguyen
Attorney, Agent, or Firm—Peter J. Dehlinger

[57] ABSTRACT

An optical data storage apparatus and disc in which information is stored in the form of multiple submicron depths at information-storage sites on the disc surface. The depth information is read by directing a focused laser beam onto the storage sites, back reflecting a portion of the reflected beam into the laser cavity, and converting power fluctuations in the laser beam to submicron distance measurements.

11 Claims, 9 Drawing Sheets

OPTICAL DATA STORAGE APPARATUS AND METHOD

This application is a continuation-in-part of copending application Ser. No. 07/414,897, filed Sep. 29, 1989, now U.S. Pat. No. 5,029,023.

FIELD OF THE INVENTION

The present invention relates to a high-density optical data storage apparatus and storage disc.

BACKGROUND OF THE INVENTION

Optical data discs are widely used for digital information storage. In a typical optical storage disc, information is encoded at data-storage positions on the disc in the form of two-state optical "spots" which are read as either "0" or "1". The disc is read by directing a laser beam onto the disc, at selected data-storage positions, and determining from the reflected light beam, which of the two states was seen at each location.

It will be appreciated that the density of stored information in this type of storage disc depends directly on the density of data-storage sites which can be achieved on the disc surface. The site density, in turn, is limited by the ability of the focused laser beam to resolve adjacent data-storage sites. Since a focused laser beam has a spot size of at least about 1-2 microns, the data-storage sites on a disc surface must be spaced by at least 1-2 microns.

It would be desirable to provide an optical data storage disc in which the density of information on the disc can be increased severalfold over current discs.

SUMMARY OF THE INVENTION

It is a general object of the invention to provide a high-density digital data storage apparatus, and storage disc in the apparatus.

The optical data storage disc of the invention has a substrate which defines a plurality of data-storage positions. Multiple-bit information is stored at each data-storage position by a structure adapted to reflect a focused coherent light beam directed against the disc surface at one of $2^N$ selected submicron displacement distances above or below a defined disc surface, corresponding to one of a selected $2^N$ bits of information, where $N>2$.

In one embodiment, the substrate carries one and preferably multiple transparent layers, each having a thickness between about 1-10 microns. Each layer defines $2^N$ submicron depths at which reflecting structure can be located, for each data-storage position, for reflecting focused coherent light from that depth at that position.

The data storage disc is used in an information storage apparatus constructed according to another aspect of the invention. The device includes a laser for producing a coherent output light beam, a lens for focusing the output beam onto the surface of the data-storage disc, and structure for moving the beam to selected data-storage positions on the disc at successive, known times.

A photodetector in the device is used to measure the power output of the laser, and the time-dependent changes in the measured power of the output beam are converted to position-dependent displacement distances at the selected data-storage sites, for determining the selected one of the $2^N$ bits stored at each such site.

Also disclosed is a method of retrieving digital information. In the method, a focused laser beam is directed onto the surface of an optical data disc of the type described above. As the beam is moved over the disc to selected data-storage positions, a portion of light reflected from each position is back reflected into the laser cavity, causing a change in laser beam power related to the depth of the reflecting site. The laser power variations are converted to digital information related to the $2^N$ depths at each storage position.

These and other objects and features of the invention will become more fully apparent when the following detailed description of the invention is read in conjunction with the accompanying drawings.

DETAILED DESCRIPTION OF THE INVENTION

A. Data-Storage Device

Figure 1:
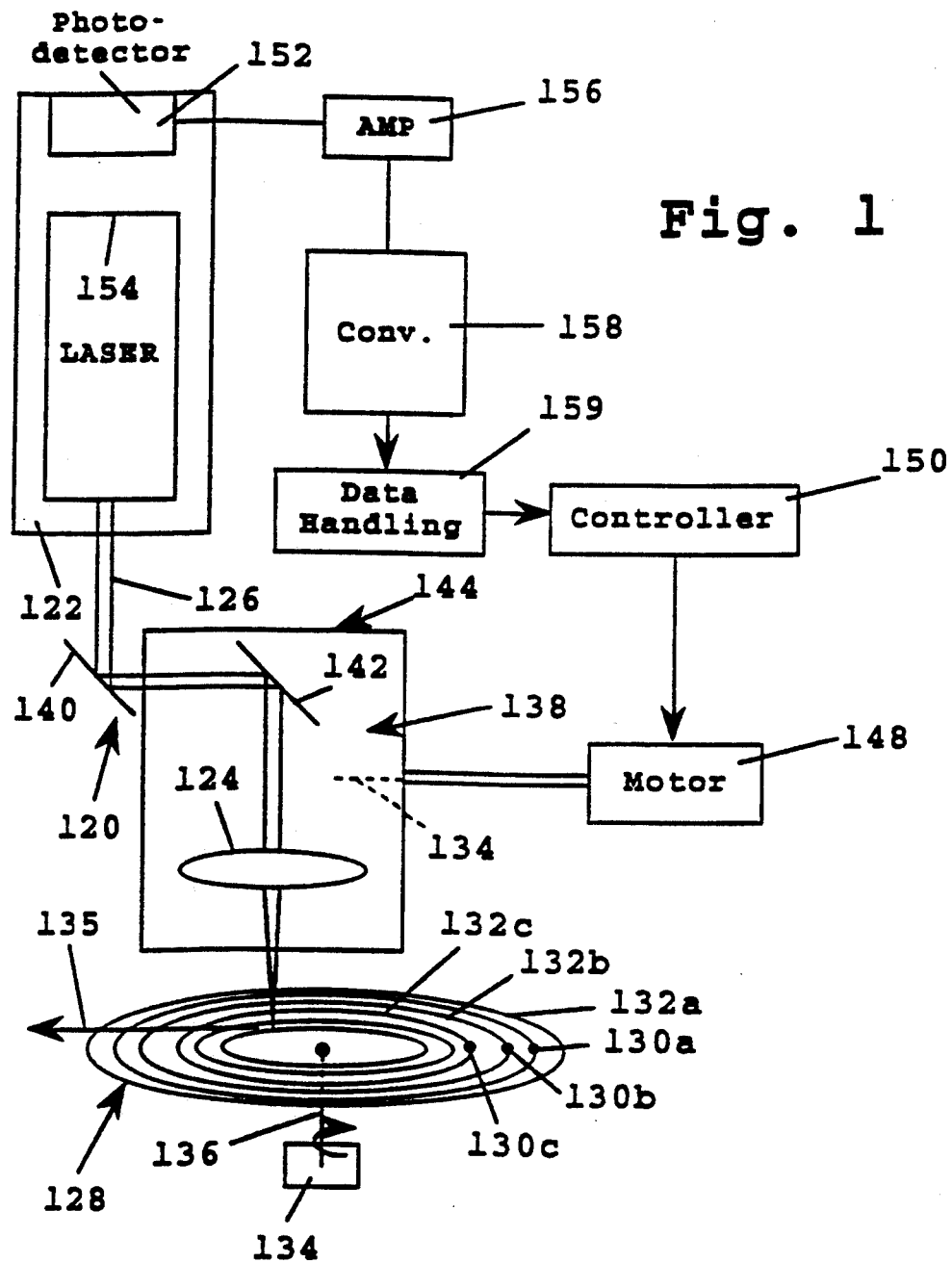
FIG. 1 is a simplified schematic view of a data-storage device constructed according to the invention.

FIG. 1 is a schematic view of a portion of an optical data-storage apparatus or device 120 constructed in accordance with the invention. The apparatus includes a stable-resonator laser 122 and an adjustable-focus objective lens 124 for focusing the laser output beam, indicated at 126, onto the surface of a data-storage disc 128 also formed in accordance with the invention. The focused beam preferably has a beam diameter of between about 0.5–2 microns at the focal point of the lens, and the depth of focus of the beam is preferably between about 1–2 microns.

One preferred type of laser is a low-power He-Ne gas laser operating in two longitudinal modes, each of which is linearly polarized. An internal linear polarizer blocks the passage of one of the two modes, so that only a single linearly polarized low-power beam is available externally. One laser of this type which is suitable commercially available is a Uniphase Model 1101P He-Ne single-mode gas laser (Uniphase, San Jose, Calif.). Where it is desired to perform target mapping at target vibrations in the 10–100 MHz range, as described below, a semiconductor laser, such as are commercially available, may be used.

The construction and characteristics of the disc will be described below. For present purposes, it is noted that the surface of the disc defines a plurality of data-storage positions, such as indicated at 130a, 130b, and 130c which are located within concentric tracks 132a, 132b, 132c, respectively, on the disc surface. At each data-storage position, information is stored in the form of a reflective region having a selected displacement distance above or below a defined surface plane in the disc. The number of different displacement distances is $2^N$, where N is greater than 2 and preferably 3 to 8 or more. That is, the disc stores $2^N$ bits of information at each data-storage position.

The disc is mounted on rotary motor 134 in the device for rotation, at a selected speed about the disc axis, indicated at 136, according to conventional disc drive construction.

An optical assembly 138 in the device is designed for shifting the position of the focused beam to different selected tracks on the data disc. The assembly includes lens 124 and pair of mirrors 140, 142 interposed between the laser and lens for directing the beam along a selected-length horizontal path in the figure. Mirror 142 and lens 124 are carried on a lens carriage 144. The carriage is shiftable, along a horizontal axis 134 in the figure, corresponding to a radial line 135 on the surface of the disc, to position the focused beam at selected tracks on the disc.

Shifting in the optical assembly is performed by a motor 148 which is operably connected to the carriage, and designed to shift the beam in selected increments, e.g., 0.005 to 0.2 mm, corresponding to the radial spacing between adjacent tracks on the disc. The increment of shifting is also adjusted to preserve the phase relationship between the output beam and the beam reflected from the disc back into the laser. This is achieved by making the increments of shifting, and therefore the spacing between adjacent tracks on the disc, equal to an integral number of wavelengths of the coherent laser beam. The position of the optical assembly is under the control of a controller 150 which instructs the motor to selected track positions on the disc, according to well-known disc drive construction.

The power of the laser output is measured by a photodetector 152 placed behind the optical cavity of the laser, for receiving light from the cavity through the rear mirror of the cavity and an opening 154 formed in the rear of the housing. The photodetector includes a silicon photodiode (shown) which is designed to measure light intensity. One suitable type of photodiode is an EG&G SGD 100-A silicon photodiode. The photodiode is connected to an operational amplifier 156 in the photodetector which outputs a DC component voltage which is linearly proportional to the power of the light beam detected by the photodiode. The operational amplifier characteristics are such that the voltage signal output which is typically obtained is in the microvolt-/millivolt range.

The amplifier is connected to a signal converter 158 which operates to convert time-dependent amplitude changes in the voltage signal received from the photodetector to binary data values at each of the selected disc locations which was "read." The construction and operation of the converter will be apparent to those skilled in the art. The data information from the converter is supplied to a data-handling device 159, such as a microprocessor, which in turn can provide signals to controller 150 for accessing information from the disc.

In operation, the laser beam in the device is focused onto the surface of a data disc, at a selected track in the disc. As the disc rotates, each data-storage position is seen by the laser beam as one of $2^N$ surface displacements above or below a defined reference plane. These surface displacements, in turn, produce a change in the phase of the light reflected back into the laser, causing a proportional change in the power output of the laser, as discussed below. The time-dependent changes in power are converted by converter 158 to time-dependent displacements read on the disc, and these are associated with given addresses on the disc according to known methods.

It will be appreciated that each data-storage position represents a selected one of $2^N$ bits of information. Since the density of data-storage positions on the disc can be made substantially as high as in conventional discs (where 2 bits of information only are stored at any storage position), the density of information on the disc, and the speed with which information can be accessed from the disc is enhanced by a factor of up to $2^{N-1}$.

B. Data-Storage Disc

Figure 2:
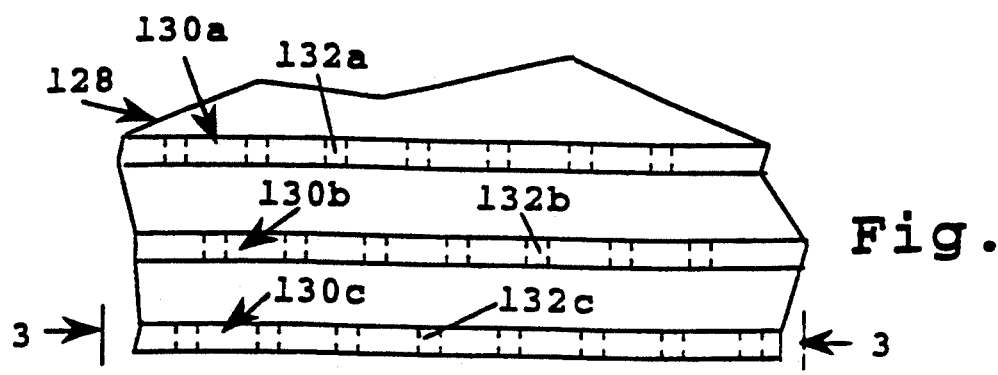
FIG. 2 is an enlarged, fragmentary portion of a data-storage disc constructed in accordance with the invention.

FIG. 2 shows an enlarged fragmentary plan view of the surface of a data storage disc, such as disc 128, constructed in accordance with the present invention. Tracks, such as tracks 132a, 132b, and 132c in the disc are indicated by solid lines, and data-storage positions, such as positions 130a, 130b, and 130c, are indicated by dotted lines. The data-storage positions on each track are spaced from one another by a distance preferably between about 5 to 200 microns, and adjacent tracks have a spacing between about 0.4 and 5 microns. The disc may be further encoded with radial and disc-angle information, for determining disc position, and with track-position information, to insure proper beam placement with respect to any selected track, according to a conventional optical data disc construction.

Figure 3:
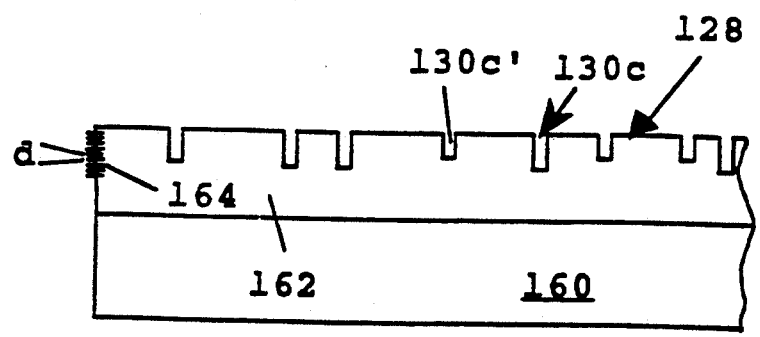
FIG. 3 is a sectional view of the FIG.-2 disc, taken generally along line 3—3 in FIG. 2.

FIG. 3 shows an enlarged fragmentary cross-sectional view of disc 128, taken generally along line 3—3 in FIG. 2, i.e., along track 132c. The disc includes a substrate 160 which may be any suitable, preferably rigid disc material, such as aluminum, glass, or the like. The substrate supports a layer 162 whose outer surface defines the data-storage locations on the disc. The thickness of the layer defines the $2^N$ different displacement distances, or thicknesses, corresponding to a selected one of $2^N$ bits of information which can be stored at each data-storage location.

For purposes of simplicity, the discs illustrated herein have 8 ($2^3$) defined displacement distances, which may include the surface plane of layer 162 and seven increasing depths below the surface, or eight subsurface depths. The different displacement distances are indicated by depth markings, such as markings 164, shown at the left in FIG. 12 and related figures which follow. Thus, for example, the data stored at position 130c corresponds to a depth 5xd, and the data stored at position 130c', to a depth 7xd.

FIGS. 4A-4F shows one method of forming a disc 170 (FIG. 4F) of the type described. Initially a substrate 172 is coated with an etchable layer 174, such as a silicon layer, using known coating methods. Layer 174, which has a preferred thickness of at least 2 microns, is coated with a photoresist coat 176, for example, by spin coating to a desired thickness, for example, 1–5 microns. Depth markings in the layer, such as markings 164, are indicated at 164 in the figures.

The coated disc is covered with a mask 178 whose openings, such as openings 180, correspond to the positions of the data-storage positions which are to have the greatest depth, Nd, where $N=2^N$. The masked photoresist coat is exposed to UV light, producing exposed regions, such as regions 182 in the resist coat (FIG. 4A), and these regions are removed by development (FIG. 4B), according to known photolithographic methods (e.g., *Introduction to Microlithography*, ACS Symposium Series, Thompson, L. F., et al., eds., ACS, 1983). The disc surface is then plasma-etched for a selected period sufficient to etch the uncovered regions of layer 174 to a depth d, corresponding to the distance between the outer surface of layer 174 and the first depth marking.

Figure 4A:
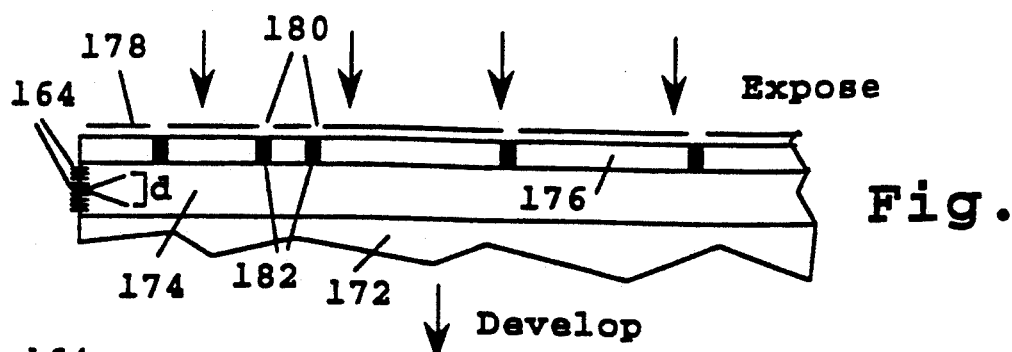
FIGS. 4A-4F illustrate steps for producing a data-storage disc constructed according to one embodiment of the invention.
Figure 4B:
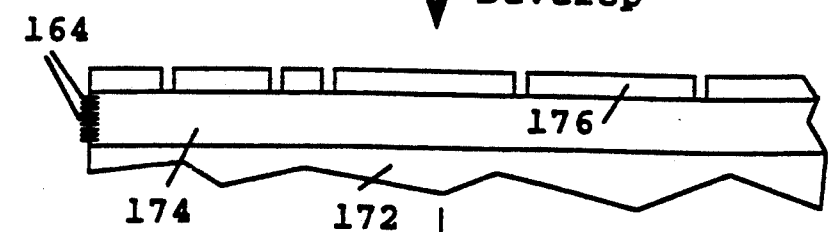
Figure 4C:
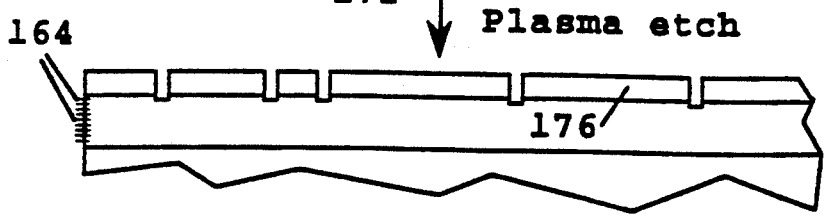
Figure 4D:
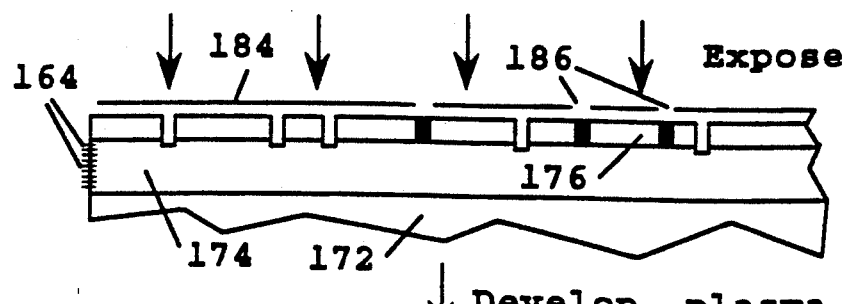
Figure 4E:
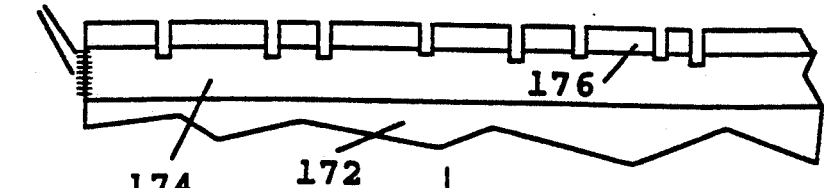
Figure 4F:
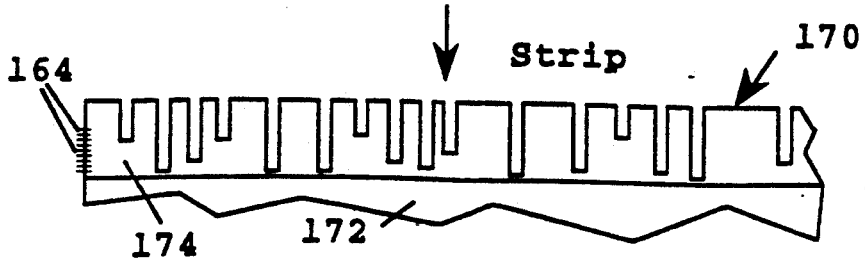

The disc is then covered with a second mask 184 whose openings, such as openings 186, correspond to the positions of the data-storage positions which are to have the next-greatest depth $(N-1)d$ (FIG. 4D). The masked photoresist coat is exposed to UV light, these regions are removed by development, and the coated substrate is plasma etched under the previously selected conditions. This second plasma etch step is effective to etch the just-uncovered regions of layer 174 to a selected depth d, and the already-uncovered regions to a depth approximately equal to 2d (FIG. 4E).

With each repeated cycle, new regions of the layer are uncovered and etched to a depth d, and previously uncovered regions are etched an additional increment d in depth. After $2^N$ cycles, e.g., 8 cycles, all of the data-storage positions have been etched to a selected depth, and the photoresist layer is removed by stripping. As seen, the resulting disc 170 is composed of an underlying substrate and an outer layer defining plural data-storage positions, each with a selected one of $2^N$ depths below the surface of the layer.

Figure 5A:
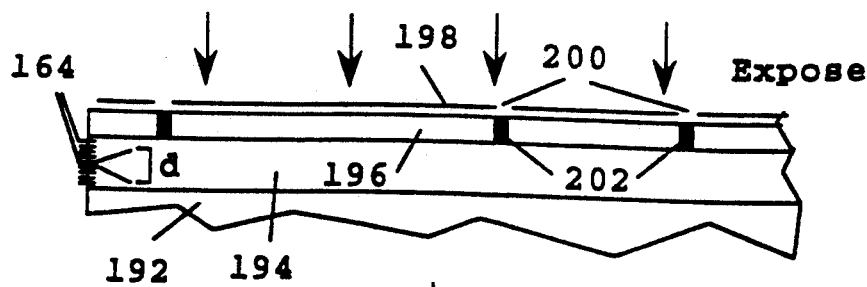
FIGS. 5A-5E illustrate steps for producing a data-storage disc like the one shown in FIG. 4F, according to a different construction method.
Figure 5B:
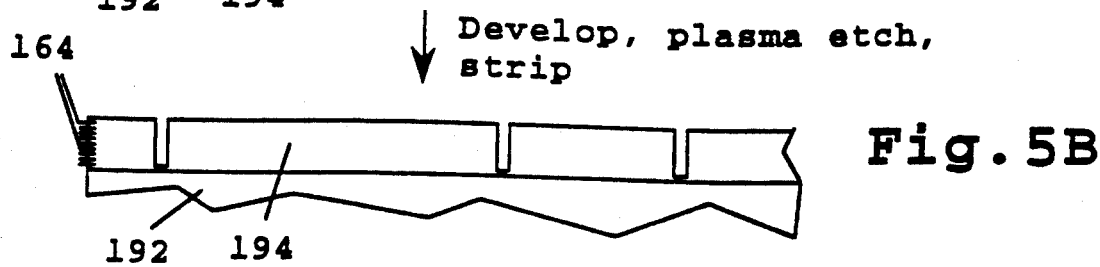
Figure 5C:
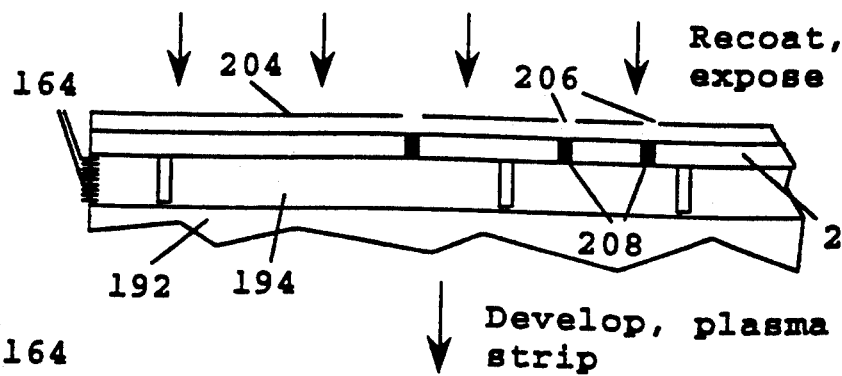

FIGS. 5A-5E illustrate another method for forming a data-storage disc 190 (FIG. 5E) of the type described above. Here a substrate 192 having an etchable layer 194 is coated with a suitable photoresist layer 196, as above. The resist layer is exposed to UV light through a mask 198 whose openings, such as openings 200, correspond to the data-storage positions which are to have the greatest depth, Nd. The light-exposed regions, such as regions 202, are removed by development (FIG. 5A), as above, and the disc is chemical-etched or plasma-etched until the uncovered regions of layer are etched to a selected depth Nd (FIG. 5B).

Figure 5D:
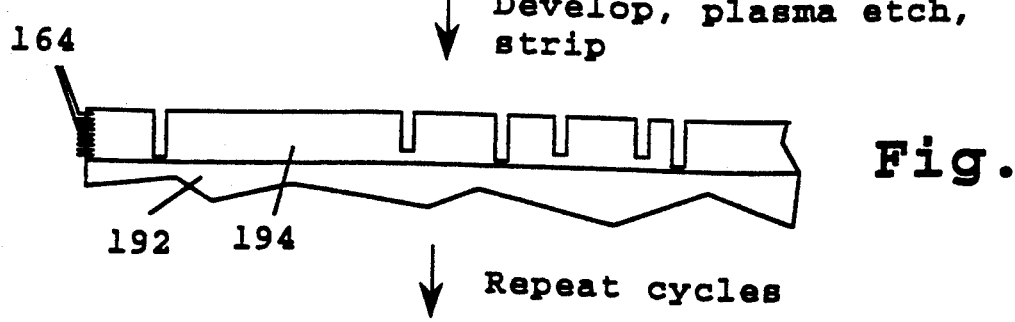

The substrate is then stripped, coated with a second coat 203, and this coat is exposed to UV, using a second mask 204 whose openings, such as openings 206, correspond to the data-storage positions which are to have the next-greatest, $(N-1)d$ depth. The light-exposed regions, such as regions 208, are removed by development and the disc is chemical-etched or plasma-etched until the uncovered regions of layer are etched to a selected depth of $(N-1)d$ (FIG. 5D).

Figure 5E:
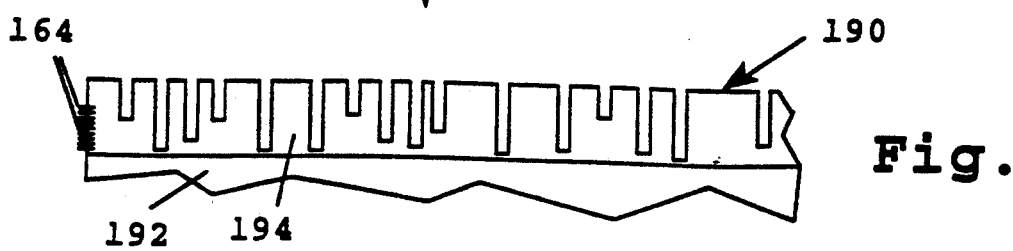

With each step, a new pattern of data-storage positions with progressively shallower etch regions is created, until after $2^N$ steps, a desired disc 190 composed of an underlying substrate and an outer layer defining plural data-storage positions, each with a selected one of $2^N$ depths below the surface of the layer, is formed (FIG. 5E).

FIGS. 6A-6D illustrate a method of forming a disc 210 (FIG. 6D), based on the ability to control the depth of removal of material from a photoresist coat, according to the dose of radiation applied to the coat. FIG. 7 shows a plot of coat thickness remaining after development in a positive-tone electron-beam resist coat, as a function of total e-beam dose (in microcoul/cm$^2$) applied to the coat (plot from Thompson, supra, p. 105). As seen, the thickness remaining in the coat after development is a well-defined linear function of log dose, up to a saturation dose of about $10^{12}$ microcoul/cm$^2$.

In preparing the disc, a substrate 112 is coated with a positive-tone e-beam resist coat 115 (Thompson, supra) having a preferred thickness of 2 or more microns. The resist layer is then covered with a mask 214 whose openings, such as openings 216, correspond to the data-storage positions which are to have the greatest depth, and the coat is irradiated with an electron beam (3-beam) for a period corresponding to a desired depth of coat removal, i.e., corresponding to a selected dose. The effective irradiation depth is indicated in coat 215 by shaded regions, such as regions 218, in FIG. 6A.

The first mask is then replaced with second mask 220 whose openings, such as openings 222, correspond to the data-storage positions which are to have the next-greatest depth. The coat is now irradiated with an e-beam for a period corresponding to the new selected depth of coat removal, as indicated by regions 224 in FIG. 6B.

Figure 6A:
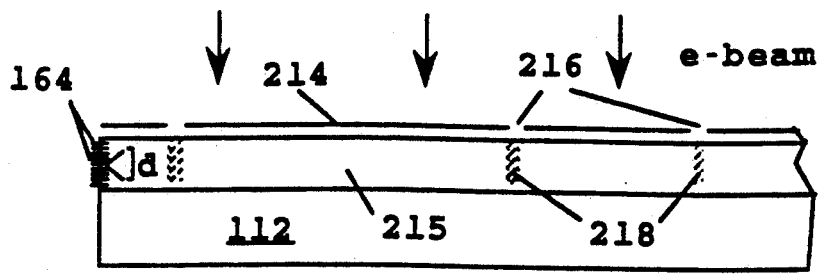
FIGS. 6A-6D illustrate steps for producing a data-storage disc according to another embodiment of the invention.
Figure 6B:
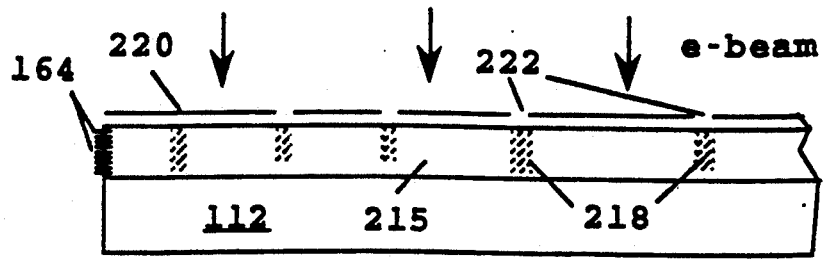
Figure 6C:
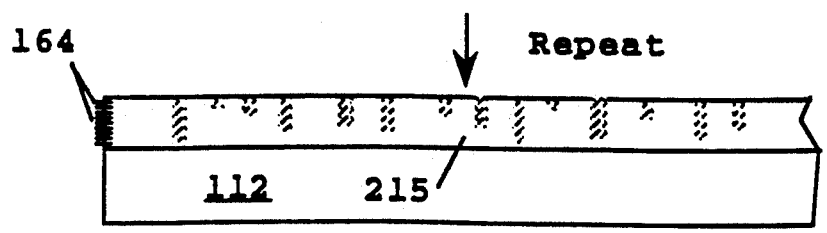
Figure 6D:
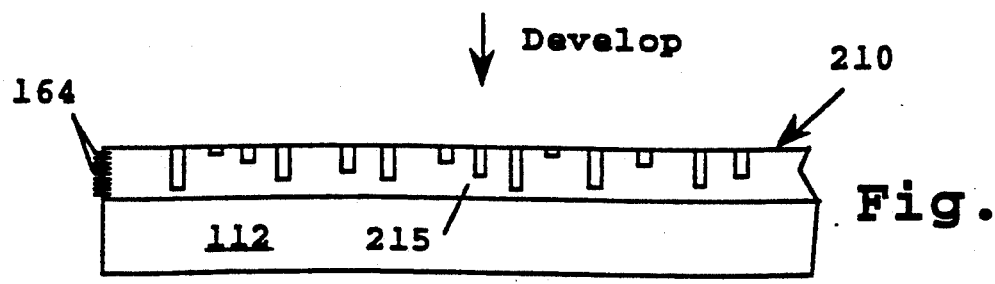
Figure 7:
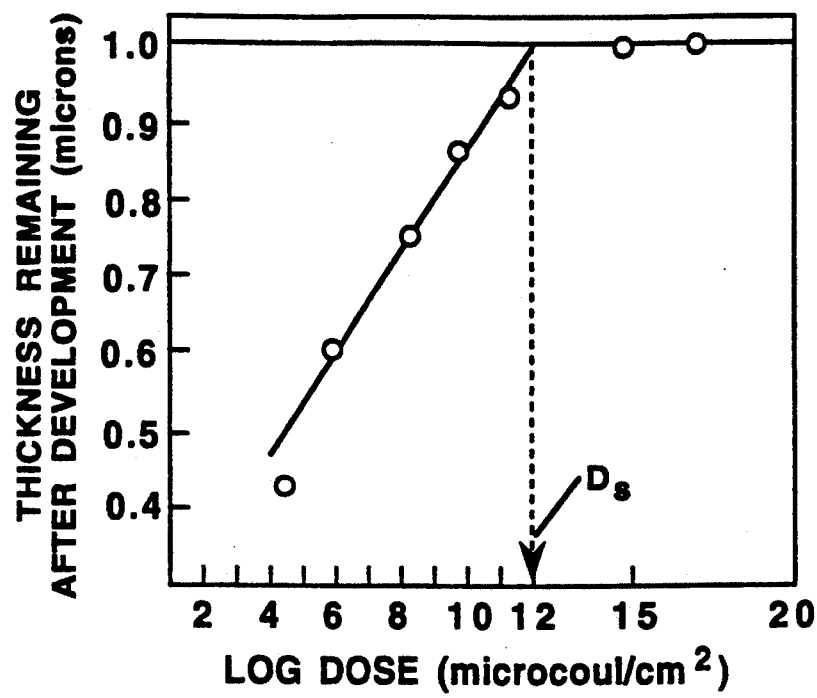
FIG. 7 is a plot showing the thickness in a photoresist layer, after development, as a function of log dose irradiation applied to the layer.

This procedure is repeated for data-storage positions at each of the selected $2^N$ depths, as shown in FIG. 6C. After all $2^N$ irradiation steps, the irradiated coat is developed to remove cavities in the coat corresponding in depth to the selected irradiation doses, as shown in FIG. 6C. After baking, to remove developing solvent from the resist coat, the coat may be covered with a transparent protective coat.

Figure 8A:
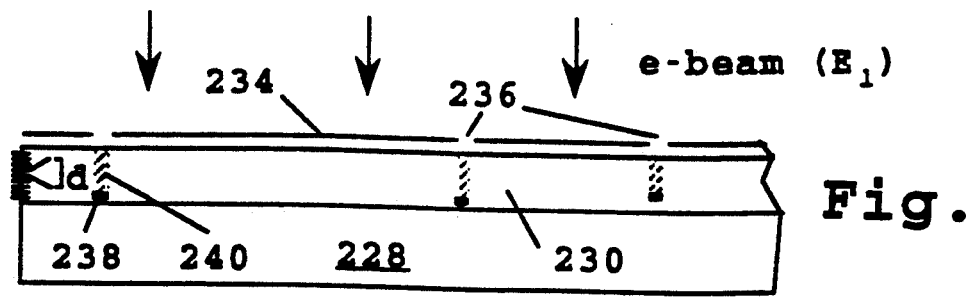
FIGS. 8A-8C illustrate steps for producing a data-storage disc according to another embodiment of the invention.
Figure 8B:
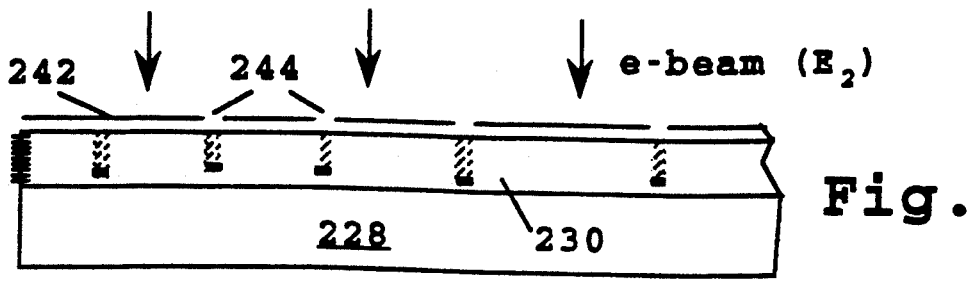
Figure 8C:
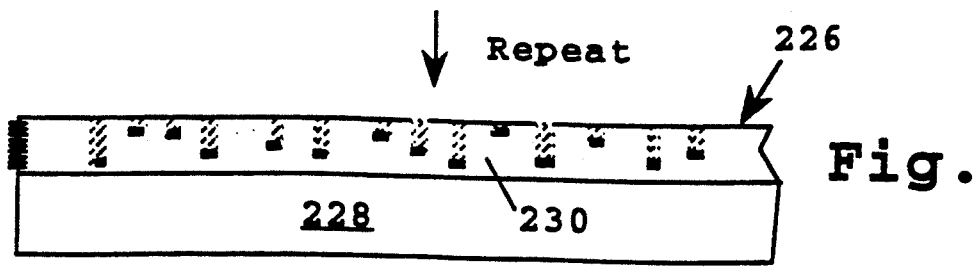

FIGS. 8A-8C illustrate a method of forming a data storage disc 226 in which the regions of reflection in a disc surface are provided by changes in the index of refraction at selected data-storage positions and selected depths within a uniform-thickness layer. The disc shown in the figures is composed of a substrate 228 coated with a layer 230, preferably about 2 microns thick. Layer 230 is formed of a transparent polymer, such as polyethylene, whose index of refraction can be selectively varied, in localized regions of the layer, according to the degree of polymerization at the localized regions.

Layer 230 is initially covered with a mask 234 whose openings, such as openings 236, correspond to the data-storage positions which are to have the greatest depth Nd, and the coat is irradiated with an e-beam whose energy is calibrated to penetrate the layer to a depth Nd, producing a localized change in index of refraction at that depth. The area of localized change in index of refraction is shown by solid line, such as line 238, at the bottom of an irradiated region, such as region 240.

The first mask is then replaced by a second mask 242 whose openings correspond to the data-storage positions where index of refraction changes are to have the next-greatest depth $(N-1)d$. The layer is now irradiated with an e-beam whose energy is calibrated to penetrate the layer to the next-up selected depth, producing index of refraction changes at that depth at the mask open positions, as shown in FIG. 8B. These steps are repeated until index of refraction changes at each of the $2^N$ depths is achieved (FIG. 8C).

C. Multiple Layer Disc

Figure 9:
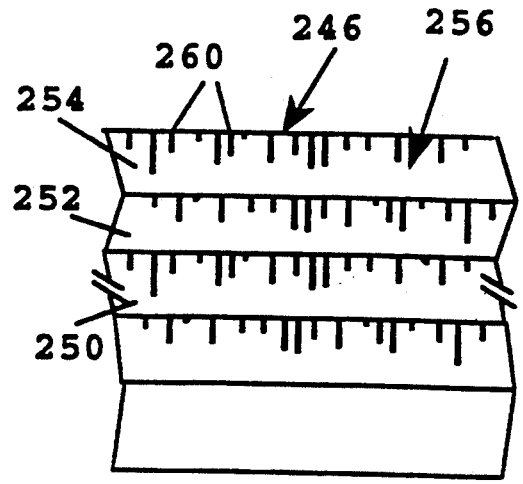
FIG. 9 illustrates a multi-layer optical data-storage disc formed in accordance with the invention.

The data storage disc of the invention can be constructed to include two or more transparent layers in a stacked configuration, as illustrated in FIG. 9. Here a stacked-disc device 246 is composed of a substrate 248 and a series of stacked layers, such as layers 250, 252, and 254, each constructed according to one of the single-layer embodiments described above. That is, each layer, such as layer 254, has a surface region 256 which defines a plurality of data-storage positions, such as positions 260, and data is stored at each region in the form of a depth (or height) which is a selected one of $2^N$ displacement distances below (or above) the surface plane of the layer. Each layer has a preferred thickness of between about 10–50 microns, and the disc may contain up to several hundred layers.

In a data-storage device which uses a multi-layer disc of this type, the plane of focus of the coherent light beam is shifted for "reading" a selected layer by suitable lens shifting means.

As an example of the increased data-storage density which can be achieved in the stacked disc, the adjustable position objective lens will be assumed to be a 100× microscope scope objective lens having a NA value of 0.6. This lens has a focal plane depth of $10\mu$. Such an objective will distinguish layers of holes spaced $20\mu$ apart. A medium having an index of refraction of 0.01 would provide 0.1% retroreflected light intensity. If 2 mm of useful depth is available (this will depend on the actual material used), 1000 separate layers could be formed.

D. Surface Depth Resolution

Figure 10:
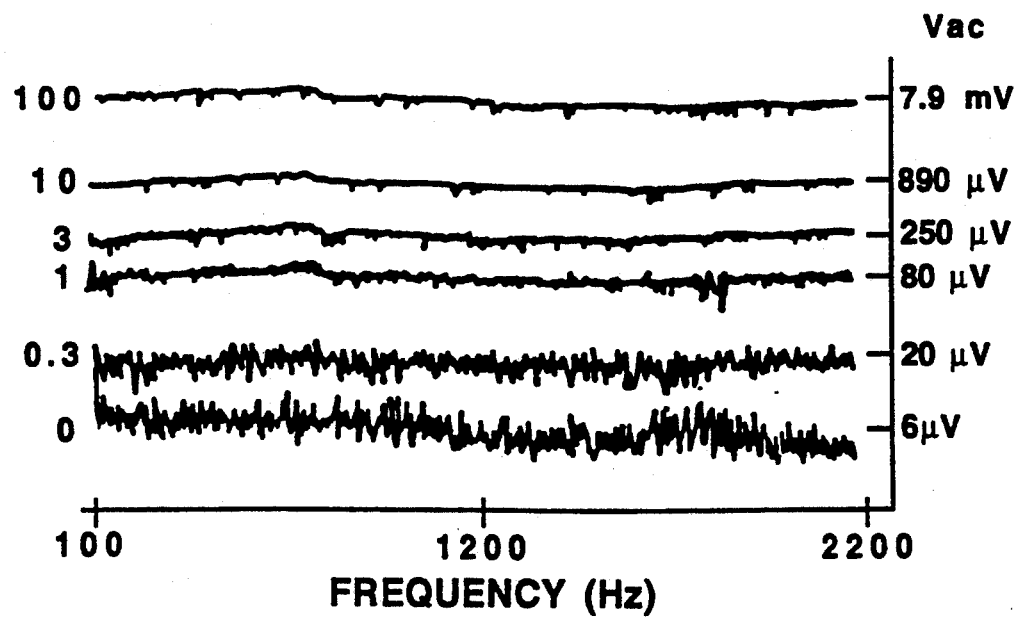
FIG. 10 shows spectra of laser power variations produced by target surface vibrations, as measured at several vibration amplitudes, indicated at the left of the spectra in nanometers, and over vibrational frequencies between 200-2200 Hz.

FIG. 10 illustrates the resolution of a laser system with back reflection, such as employed in the apparatus of the invention, to detect surface displacements in the direction normal to the surface, e.g., surface displacements due to variations in the depth of surface displacements on the optical data storage disc of the invention.

The target here is attached to a commercially available piezoelectric transducer (PZT) having a response of about 4.4 nm displacement/V. A stiff paper card was attached to the surface of the transducer to serve as the vibrating target surface. Voltages from a sine-wave oscillator (10 Hz to 20 kHz) or the synchronized sweep frequency output from an audio spectrum analyzer (Hewlett-Packard 3580A) were used to drive the transducer directly or through an amplifier for the larger motional amplitude ranges.

The PZT vibration amplitude is shown at the left axis in FIG. 10, and the corresponding power output in voltage units, along the right axis. For each voltage applied to the transducer the frequency was swept or varied from 200 Hz to 2.2 kHz. The flatness of the traces indicates the flat response of the piezoelectric over the range of driving frequency.

It can be appreciated from the spectra shown in FIG. 10 that the amplitude of the measured signals is linearly related to the amplitude of the transducer vibrations. For example, with reference to the two spectra at the top in FIG. 10, a tenfold increase in vibration amplitude (from 10 to 100 nm) corresponds to an approximately ten-fold increase in detected laser output measured as a voltage; similarly, a 100-fold increase in vibration amplitude yields an approximately 100-fold increase in measured voltage. The noise in the spectra for vibration amplitudes below 1 nm is due to background electronic noise and random laser light beam output variations.

Similar results were obtained when the target surface was a transducer covered with brushed steel, plastic, and mylar, indicating that the data disc surface can be formed of a variety of materials. In particular, it has been discovered that a distance-dependent laser moduation effect produced by retroreflection from a surface is observed even when the reflector is a diffuse, non-specular surface. In fact, the paper card reflector used in the studies described above has readily apparent "fuzzy" surface irregularities which are in the several micron size range, as judged by light microscopy. Yet the reflected beam from this surface is able to produce linear distance-modulated laser power effects in the distance range between 1–10 nm, as discussed below with respect to FIG. 11.

The signal-to-noise ratio as monitored by the output of the operational amplifier is due to laser-light intensity fluctuations and electronic noise in the photodetector. The exact noise voltage at the output of the current-to-voltage electronics depends on the specific laser's amplitude fluctuations, the detector and its associate circuitry, and on the bandwidth of the measurement. For the bandwidth of the circuit used, the noise voltage was 2 microvolts, giving a signal-to-noise ratio of at least 40 dB.

In the method described above, displacement measurements down to the 10 picometer range have been made. The limiting noise in the apparatus is due predominantly to laser amplitude fluctuations, which in theory can be reduced by up to two orders of magnitude. It is also noted that detector noise levels down to $10^{-2}$ pm/(Hz)$^{-\frac{1}{2}}$ have been reported (D. Rugar et al., Rev. Sci. Instru., 59:2337, 1988). Thus, assuming that mechanical vibrations in the microscope can be reduced sufficiently, the data storage device should be able to detect position-dependent surface displacements down to the 0.1–1 picometer range, particularly by employing phase-lock or time-averaging signal-to-noise improvement techniques. Even within the range of demonstrated linearity between 1–10 nm (FIG. 11 below), a disc surface layer having a thickness of 10 microns would be able to accommodate between 1,000 and 10,000 (about $2^{10}$ to $2^{13}$) bits of information at each data-storage position. Typically, the disc is designed to encode $2^3$, $2^4$, or $2^5$ bit words at each location.

Figure 11:
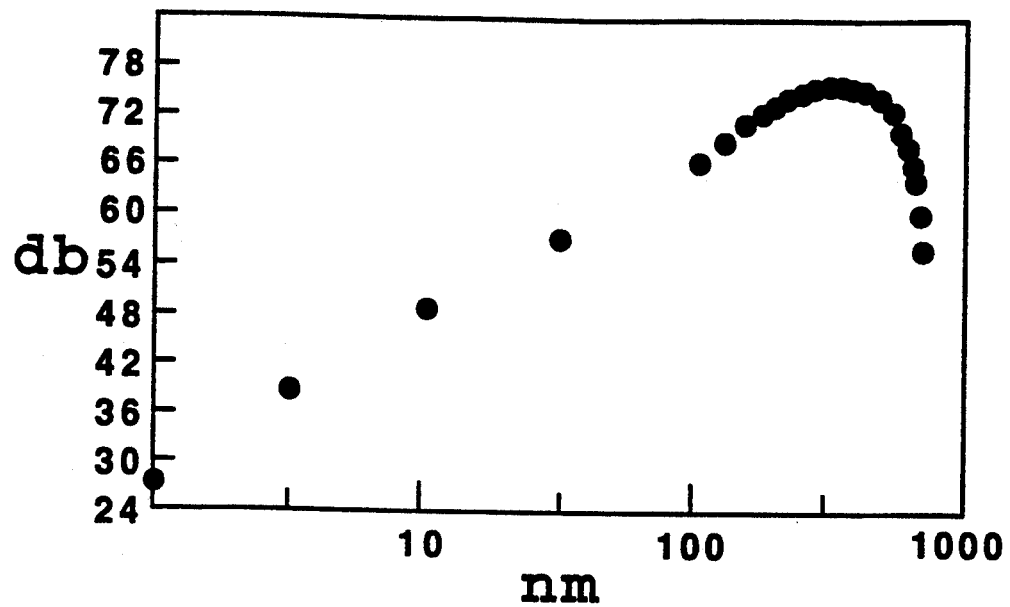
FIG. 11 shows a plot of peak power fluctuation at a fixed frequency, as a function of increasing peak amplitudes of vibration.

The range of linearity with respect to amplitude can be determined by keeping the frequency constant as the amplitude is varied and plotting the power output (voltage) versus amplitude as in FIG. 11. The linear relationship holds over a range of vibration amplitudes extending below about one quarter of the incident light's wavelength. For vibration amplitudes greater than this upper limit, the relationship becomes non-linear. However, as seen below, the relationship between vibration amplitude and measured laser power output in the high-amplitude range is still predictable, and therefore useful in determining large-amplitude displacements from the measured power output fluctuations of the laser. For a He-Ne laser, the wavelength of emitted light is 632 nanometers; thus, the range of linearity (taking background noise into consideration) extends up to about 150 nm.

Figure 12:
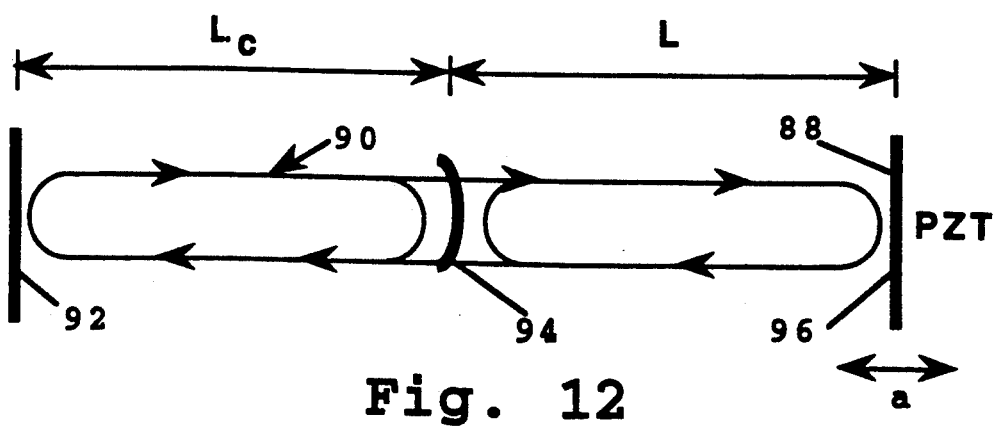
FIG. 12 shows a theory parameter diagram of an experimental configuration used for measuring laser power output as a function of displacement of a piezoelectric transducer.

FIG. 12 is a theory parameter diagram of an experimental configuration used for measuring laser power output as a function of displacement of a piezoelectric transducer (PZT) 88. Here $L_c$ represents the length of the laser cavity 90, defined by two mirrors 92 and 94, and L represents the distance between mirror 94 and a reflecting surface 96 carried on the PZT. Experimentally, the PZT was placed 20 cm from the laser exit port, and was driven by a DC signal from a PZT high-voltage amplifier, or a 40 Hz AC sine wave signal coupled to the amplifier. A silicon photodetector (not shown) was operated in the photovoltaic mode so that its voltage output was linearly proportional to the light intensity input. The detector was positioned at the rear of the laser head where a hole had been drilled to allow light to escape from the approximately 99% reflecting back mirror. The voltage signal from the photodetector was sent either directly to an x-y recorder for plotting of the laser intensity DC variation or to the recorder via a phase sensitive lock-in amplifier for plotting the magnitude of the AC variation.

In a first study, the surface of the PZT was moved slowly towards the laser (i.e. L decreased) and the output of the photodetector was observed. The voltage output was a DC signal with sinusoidal variation. The sinusoid went through one period as the PZT moved one half-wavelength of the laser light (316.4 nm). This behavior was observed for three different surfaces: the polished surface of a silicon chip, the rough backside of that chip, and the brushed stainless steel surface of the PZT. The amplitudes of the sinusoid as a percentage of the total signal from the photodetector were 47%, 1.3% and 0.3% respectively, for the three surfaces.

In a second study, the PZT was oscillated about a distance L with a fixed amplitude and frequency while L was slowly decreased. The output of the amplifier, at the oscillation frequency of the PZT (40 Hz) showed a sinusoidal variation with full period corresponding to movement of the PZT of a half-wavelength toward the laser. For the above-mentioned three surfaces, the signal strengths as a percentage of the average signal from the PD were 13%, 0.13%, and 0.25%, respectively, and 0.04% for the surface of a stiff paper card.

Figure 13:
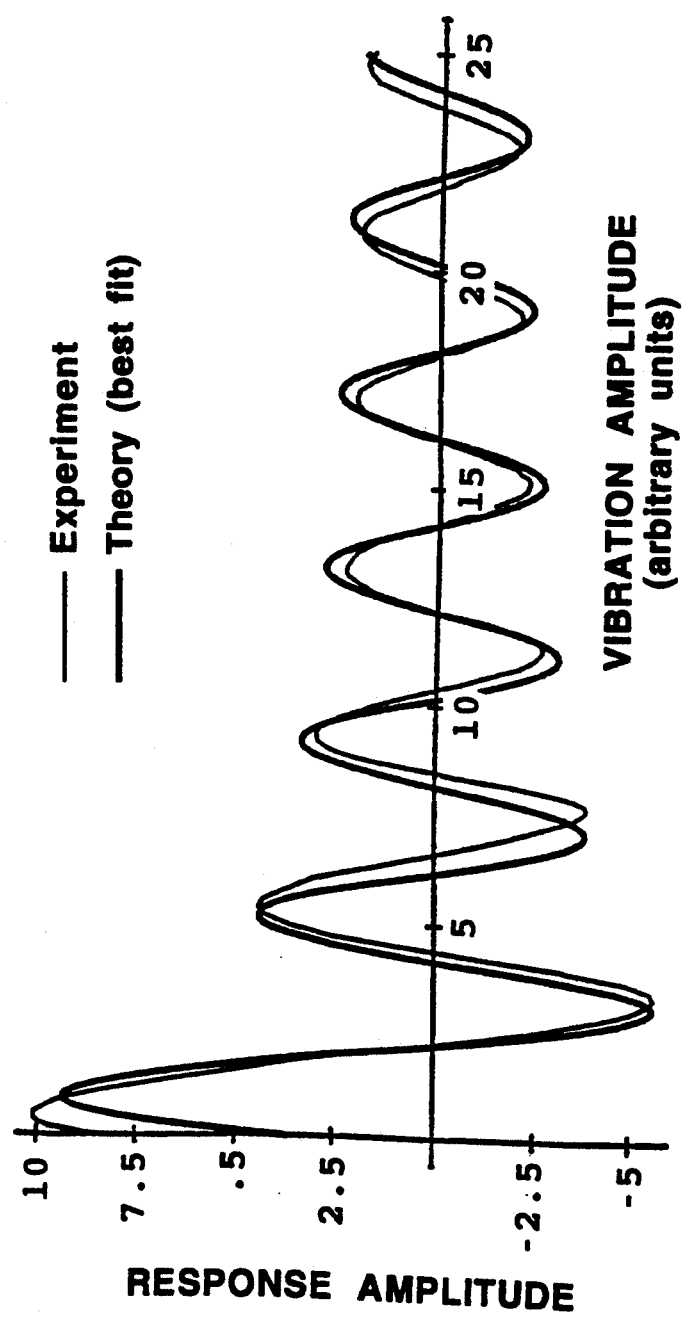
FIG. 13 is a plot of laser power amplitude as a function of oscillation amplitude of a target (light line) and calculated from theory (dark line).

In a third study, the amplitude of the oscillation over a range of approximately 3 wavelengths (1.9 $\mu$m) was varied, at a fixed frequency and fixed L. The amplitude of the signal from the amplifier, as a function of PZT vibration amplitude is shown in light line in FIG. 13. The response amplitude shows a Bessel function behavior (solid line).

The studies just described employed a vibrating surface to illustrate time-dependent changes in target-surface distance from the laser to a target surface. It will be appreciated that the time-dependent amplitude changes on the surface allow for more accurate and reliable distance measurements than could be made by measuring changes in a DC signal alone, since drift in DC levels, and problems of measuring absolute DC levels, are avoided.

In the present invention, time-dependent fluctuations in laser-to-surface distances are achieved by the rapid rotational motion of the disc with respect to the laser beam, producing a relatively constant frequency variation in depth. The resulting response amplitude of the laser contains a baseline or reference voltage level corresponding to the planar regions of the disc between adjacent data-storage positions, and peaks of different heights corresponding to one of the $2^N$ different surface depths at a data-storage position.

E. Surface Reflectance Effects

As indicated above, a variety of surfaces having different roughnesses and reflectances were examined for surface displacement effects. One interesting finding is that even surfaces with high surface roughness, such as a file card, which may have a surface roughness corresponding to several wavelengths, give measurable displacement effects in the nm or lower range.

One explanation of this phenomenon is that the resonance modulation effect due to the phase of back reflected light is responsive to a weighted average of the wavelets produced by reflection from other various reflecting planes in the target region. The phenomenon represents an important aspect of the invention, since it allows for high-resolution displacement measurements on disc surfaces with a wide range of surface roughnesses, or in transparent media having changes in index of refraction at selected depths.

Although the invention has been described with respect to particular embodiments and applications, it will be apparent to one skilled in the art how the method and apparatus of the invention can be modified or adapted to a variety of other applications.

It is claimed:

1. An optical data storage apparatus for storing and retrieving digital information, comprising
   an optical data disc having a substrate whose surface defines a plurality of data-storage positions,
   a stable-resonator laser having a resonator cavity, for use in producing a coherent output light beam,
   means for focusing said output beam onto the surface of said disc,
   at each data-storage position on the surface of said substrate, reflecting means effective to reflect the focused coherent beam, when said beam is directed against said position, from a selected one of $2^N$ submicron displacement distances normal to the surface of the substrate, where N is an integer greater than 2, corresponding to a selected one of $2^N$ bits of information, back into the laser cavity,
   means for moving the focused output beam relative to the disc surface to selected data-storage positions thereon, at successive, known times,
   means for measuring the power of said output beam, as the focused primary beam is moved to such selected sites, and
   means operatively connected to said moving means and said measuring means for converting time-dependent changes in the measured power of said output beam to position-dependent displacement distances at the selected data-storage sites, for determining the selected one of the $2^N$ bits stored at each such site.

2. The apparatus of claim 1, wherein said reflecting means includes, at each of said data-storage positions, a cavity formed in the substrate and having a selected depth of one of the $2^N$ submicron distances below the substrate surface.

3. The apparatus of claim 1, wherein said reflecting means includes, at each of said data-storage positions, a projection on the substrate having a selected height of one of the $2^N$ submicron distance above the substrate surface.

4. The apparatus of claim 1, wherein the reflecting means is a diffuse, non-specular reflector.

5. The apparatus of claim 4, wherein said substrate has a transparent outer layer which defines said plurality of data-storage positions, and a depth which encompasses said $2^N$ submicron distances normal to the surface of the substrate, and said reflecting means includes means at each data-storage position for reflecting said focused light beam from a selected one of the $2^N$ depths in said layer.

6. The apparatus of claim 5, wherein said reflecting means includes, at each data-storage position, a variation in the index of refraction of the material forming said layer at a selected one of the $2^N$ submicron depths below the outer surface of said layer.

7. The apparatus of claim 6, wherein said disc includes at least two such transparent layers arranged in a stacked configuration, and said focusing means is operable to focus the primary beam onto a selected layer on the disc.

8. An optical data storage disc comprising
a substrate having a surface defining a plurality of data-storage positions, and
at each data-storage position, reflecting means effective to reflect a focused coherent beam, when said beam is directed against said position, from a selected one of $2^N$ submicron displacement distances normal to the surface of the substrate, corresponding to a selected one of $2^N$ information bits, where $N>2$,
wherein said substrate has a transparent outer layer which defines said plurality of data-storage positions, and a depth which encompasses said $2^N$ submicron distances normal to the surface of the substrate, and said reflecting means includes means at each data-storage position for reflecting said focused light beam from a selected one of the $2^N$ depths in said layer.

9. The disc of claim 8, wherein said reflecting means includes, at each data-storage position, a change in the index of refraction of the material forming said layer at a selected on of the $2^N$ submicron depths below the outer surface of said layer.

10. The disc of claim 9, wherein said disc includes at least two such transparent layers arranged in a stacked configuration, and said focusing means is operable to focus the primary beam onto a selected layer on the disc.

11. A method of retrieving digital information, comprising
directing a focused laser beam onto the surface of an optical data disc whose surface defines (i) a plurality of data-storage positions, and (ii) at each such position, one of $2^N$ submicron displacement distances normal to the surface of the substrate, where N is an integer greater than 2, corresponding to a selected one of $2^N$ bits of information,
moving the focused beam relative to the disc to a selected data-storage positions on the disc,
at each such position, back reflecting at least a portion of the laser beam reflected from such positions,
measuring the power of said output beam, as the focused primary beam is moved to each such selected position, and
converting the measured power of said output beam at the selected data-storage positions to one of $2^N$ bits of information at that position.

* * * * *